United States Patent Office 3,027,368
Patented Mar. 27, 1962

3,027,368
PROCESS FOR THE PRODUCTION OF 6α-FLUORO-CORTISONE-21-ACETATE AND INTERMEDIATES THEREIN
Carl Djerassi and Howard J. Ringold, Mexico City, Mexico, assignors to Syntex S.A., Mexico City, Mexico, a corporation of Mexico
No Drawing. Filed Aug. 13, 1959, Ser. No. 833,386
Claims priority, application Mexico Aug. 13, 1958
19 Claims. (Cl. 260—239.55)

This invention relates to a new method for the preparation of cyclopentano phenanthrene derivatives.

More particularly, this invention relates to a new method for preparing 6α-fluoro-cortisone 21-acetate, described and claimed in patent application Serial No. 740,550, filed on June 9, 1957, now U.S. Patent No. 2,934,546, starting from certain easily accessible plant steroid material, specifically from botogenin (12-keto-diosgenin).

It is the object of the present invention to provide a process for the production of the aforesaid cortisone derivative, which does not require a micro-biological introduction of the hydroxyl group in 11β-position, but produces the aforesaid derivative exclusively by chemical reactions from a commercially available sapogenin which already contains either oxygen at C–11 or a hydroxyl group in 11α-position.

A sapogenin which satisfies the above conditions is 11α-hydroxy-diosgenin, obtained from botogenin which in turn can be isolated from native Mexican plants, and is, therefore, the preferred starting material in the present process. Methods for preparing 11α-hydroxy-diosgenin from botogenin have been described in Patents 2,776,969, issued January 8, 1957, and 2,840,555 issued June 24, 1958.

From 11α-hydroxy-diosgenin a key intermediate Δ$^{5,16}$-pregnadiene-3β-ol-11,20-dione is prepared, by the method described in patent application Ser. No. 765,056, filed October 3, 1958. Preferably, a 3-ester of the aforesaid key intermediate, for instance the 3-acetate, is used as the starting material in the present process.

The 3-acetate of Δ$^{5,16}$-pregnadiene-3β-ol-11,20-dione is produced from 11α-hydroxy-diosgenin by partial acylation at C–3 to form 11α-hydro-diosgenin 3-acetate; further by oxidation of the latter compound to produce the 11-keto-diosgenin ester; thereafter the spiroketal side chain of this keto-diosgenin ester is degraded to obtain the desired key intermediate.

The aforesaid steps described in the last mentioned patent application Ser. No. 765,056, as well as the further steps of the process of the present invention, are illustrated in the following reaction equation:

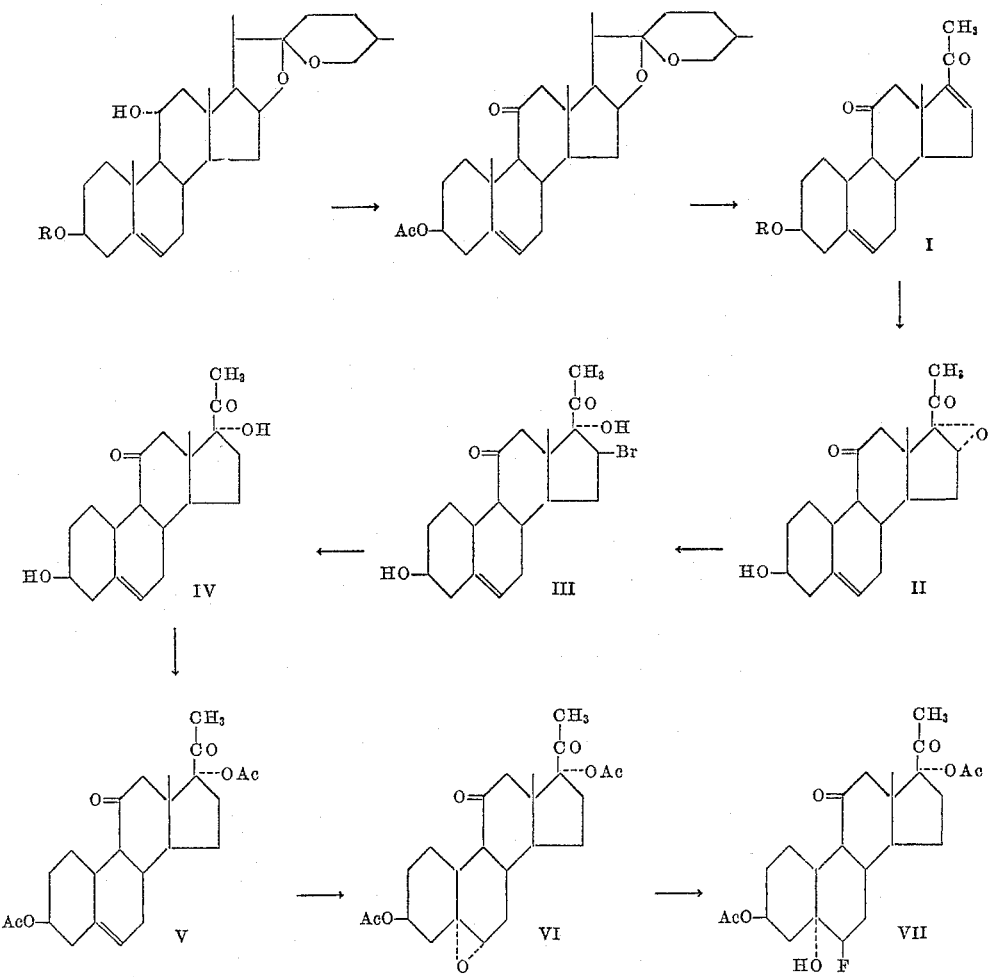

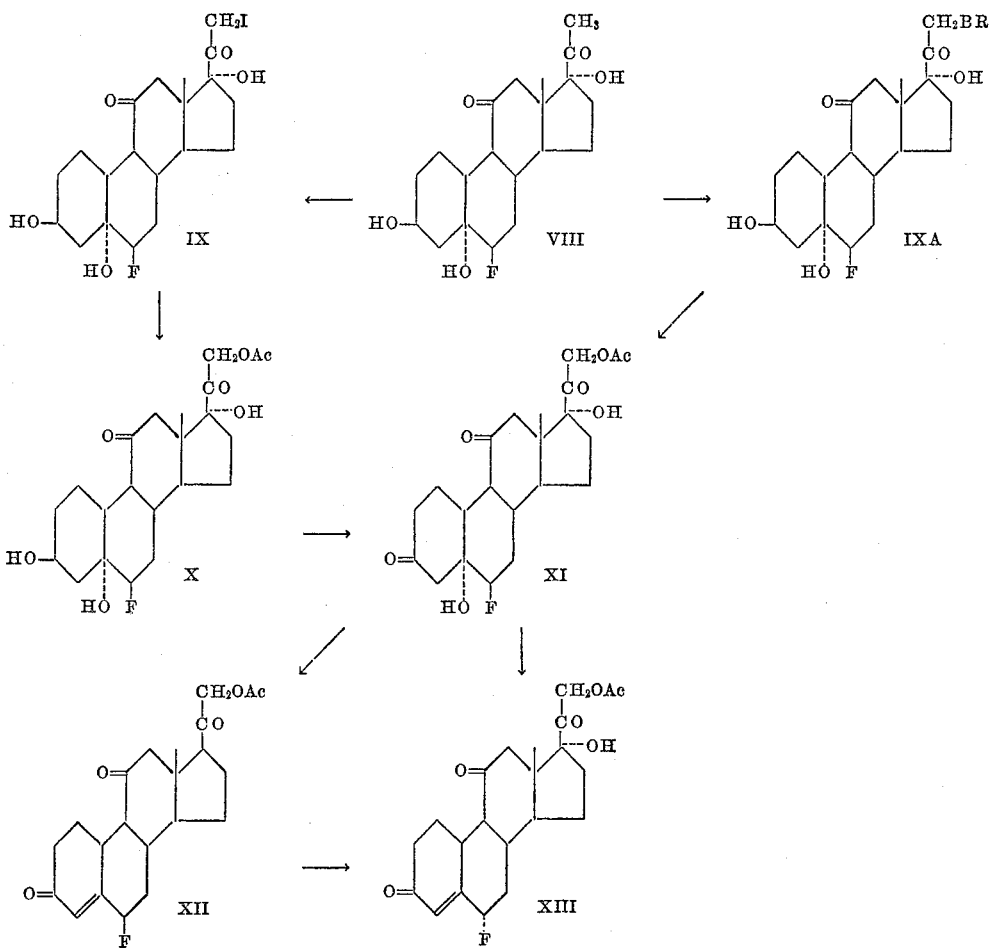

In the above equation R represents an ester group of a hydrocarbon carboxylic acid of less than 12 carbon atoms. These may be those conventional in the art, i.e. aliphatic, cyclic or mixed cyclic-aliphatic. In general, however, for the process the lower fatty acid esters are desirably used such as acetate or propionate and R may desirably represent these acyl groups.

In practicing the steps above set forth the hydroxyl group at C–3 of 11α-hydroxy diosgenin was selectively esterified by treating the free compound with slightly over one molar equivalent of a lower fatty acid anhydride such as acetic anhydride in pyridine solution and at a temperature substantially below room temperature. The 3-mono lower fatty acid esters of 11α-hydroxy-diosgenin thus prepared, were then oxidized by an oxidizing agent for secondary hydroxyl groups, chromium trioxide in aqueous acetic acid solution, for example to form 11-keto-diosgenin lower fatty acid esters. Oxidative degradation of the sapogenin side chain by the usual methods, i.e. heating under pressure with a lower fatty acid anhydride (preferably acetic) and treatment with chromium trioxide in acetic acid etc., gave the 3-lower fatty acid esters of $\Delta^{5,16}$-pregnadien-3β-ol-11,20-dione (I). The 16,17-double bond of these compounds were then epoxidized preferably with hydrogen peroxide in alkaline solution (i.e. alkali metal hydroxide) to give 16α,17α-oxido-$\Delta^5$-pregnen-3β-ol-11,20-dione (II) since the ester group is simultaneously saponified.

Preferably, the 3-acetate of (I) is subjected to the above alkaline treatment with hydrogen peroxide in an aqueous methanol solution of sodium hydroxide.

The resulting 16α,17α-oxido-$\Delta^5$-pregnen-3β-ol-11,20-dione was treated with hydrogen bromide, for example in solution in acetic acid or in a mixture of acetic acid and methlylene chloride, to form 16β-bromo-$\Delta^5$-pregnene-3β,17α-diol-11,20,dione (III); this bromohydrin was debrominated by catalytic hydrogenation, preferably in the presence of a palladium on charcoal catalyst, in mixture with ammonium acetate and methanol; alternatively, the debromination was effected by refluxing with Raney nickel in mixture with ethanol. Thus we obtained $\Delta^5$-pregnene-3β,17α-diol-11,20-dione (IV), which was acetylated to the diacetate (V) by treatment with acetic anhydride in the presence of an acid catalyst, such as p-toluenesulfonic acid.

We then epoxidized the $\Delta^5$ double bond of (V) by reaction with a peracid, for example with monoperphthalic acid in mixture with ether and chloroform, and after chromatography there was isolated 5α,6α-oxido-pregnane-3β,17α-diol-11,20-dione diacetate (VI).

The epoxide ring was opened by reaction with boron trifluoride etherate in mixture with ether and benzene to produce 6β-fluoro-pregnane-3β,5α,17α-triol-11,20-dione 3,17-diacetate (VII); the acetate groups were hydrolyzed by alkaline treatment, such as reaction with dilute methanolic potassium hydroxide or sodium methoxide solution, at low temperature and under an atmosphere of nitrogen, to produce the free 6β-fluoro-pregnane-3β,5α,17α-triol-11,20-dione (VIII).

An acetoxy group was then introduced at C–21 by halogenation at C–21 followed by acetolysis. For this purpose, in one mode of practicing our invention, we treated compound VIII with iodine and calcium oxide in mixture with tetrahydrofurane and methanol to produce 6β-fluoro-21-iodo-pregnane-3β,5α,17α-triol-11,20-dione (IX) which was refluxed with potassium acetate in acetone solution. Alternatively, we brominated intermediate VIII at C–21 by reaction with 1 molar equivalent of bromine in dioxane or chloroform solution. The resulting 6β-fluoro-21 - bromo-pregnane-3β,5α,17α-triol-11,20-dione (IXA) was reacted with sodium iodide in mixture with acetone or methanol, and the intermediarily formed 21-iodo compound was acetoxylated by the aforementioned method.

The exchange of iodine for bromine and the acetolysis of the iodo compound can be effected either in two separate steps, or in a single step by a treatment which will be described in detail in the examples given further below. Thus we obtained 6β-fluoro-pregnane-3β,5α,17α,21-tetrol-11,20-dione 21-acetate (X).

Compound X was oxidized at C–3 to 6β-fluoro-pregnane - 5α,17α,21-triol-3,11,20-trione 31-acetate (XI) by reaction with chromic acid in mixture with aqueous acetic acid. Alternatively, the chromic acid can be used under the form of an 8 N solution, for which purpose the chromium trioxide is dissolved in concentrated sulfuric acid and the solution is diluted with water to attain the required concentration. This oxidizing reagent is then added to a solution of the steroid in acetone.

Compound XI was then dehydrated at C–5 by reaction with small amounts of aqueous concentrated hydrochloric acid in acetic acid solution, thus forming 6β-fluoro-cortisone 21-acetate (XII); the latter was treated in glacial acetic acid solution with dry hydrogen chloride to invert the steric configuration at C–6, thus giving rise to the formation of the desired 6α-fluoro-cortisone 21-acetate (XIII); alternatively, we treated XI directly with dry hydrogen chloride in glacial acetic acid solution to produce 6α-fluoro-cortisone 21-acetate in a single step.

To those skilled in the art it is obvious that our method can be modified within wide limits, both with respect to the reagents and solvents employed as with respect to the conditions under which the reactions are carried out. The following examples serve to illustrate our method but do not imply any limitation to its scope.

For example, the double bond of II can be epoxidized by reaction with perbenzoic acid in chloroform solution; the inversion of the steric configuration at C–6 can be achieved by reaction with any other acid sufficiently strong to cause it.

*Example I*

A solution of 6 g. of Δ$^{5,16}$-pregnadien-3β-ol-11,20-dione in 400 cc. of methanol was cooled to 15° C. and treated with 12 cc. of 4 N sodium hydroxide solution, followed immediately by the addition of 24 cc. of 30% hydrogen peroxide solution. The mixture was kept in the refrigerator for 24 hours at a temperature around 5° C. and then poured into 1,600 cc. of water; the precipitate was collected by filtration, washed with water and dried, thus affording 16α,17α - oxido-Δ$^5$-pregnen-3β-ol-11,20-dione which was used for the next step without further purification. The pure compound was obtained by recrystallization from methanol.

A solution of 5.3 g. of the above oxido compound in a mixture of 40 cc. of methylene chloride and 3 cc. of glacial acetic acid was cooled to 0° C. and treated by adding in small portions or in a slow manner 3.6 cc. of a 32% solution of hydrogen bromide in acetic acid, under stirring and while taking care that the temperature did not rise above 20° C. The mixture was kept standing for 20 minutes further and was then cooled to 10° C. and treated under vigorous stirring with a mixture of 25 g. of ice and 25 cc. of water. The formed precipitate was collected, washed with 5 cc. of methylene chloride previously cooled to 5° C., and dried under vacuum at a temperature below 35° C. We thus obtained 16β-bromo-Δ$^5$-pregnene-3β,17α-diol-11,20-dione which contained a small amount of its 3-acetate; the crude product was used for the next step without further purification. A pure sample of 16β - bromo-Δ$^5$-pregnene-3β,17α-diol-11,20-dione was obtained by chromatography on neutral alumina.

A mixture of 5 g. of the above bromohydrin, 1.2 g. of pure ammonium acetate, 500 mg. of 5% palladium on carbon catalyst and 90 cc. of methanol was stirred for 90 minutes under hydrogen, at a pressure of 570 mm. of Hg and 25° C.; at the end of this time the absorption of hydrogen had practically ceased. The suspension was refluxed for 1 hour with 1.2 g. of potassium carbonate dissolved in 10 cc. of water, the mixture was acidified with acetic acid, concentrated to about 20 cc. under reduced pressure and cooled in an ice bath. The solid, consisting of a mixture of Δ$^5$-pregnene-3β,17α-diol-11,20-dione and of the catalyst, was collected by filtration and dried at temperatures around 90° C. The residue was extracted with pyridine, filtered, the filtrate was evaporated and cooled, thus giving Δ$^5$-pregnene-3β,17α-diol-11,20-dione, which was used for the next step without further purification. A pure sample of the compound was obtained by recrystallization from methanol.

A mixture of 4 g. of the above crude compound, 20 cc. of acetic anhydride and 500 mg. of p-toluenesulfonic acid monohydrate was stirred at room temperature for 24 hours. After pouring into water, the mixture was heated on the steam bath for half an hour, and the formed precipitate was collected, washed with water, dried and recrystallized from methanol containing a small amount of pyridine. There was thus obtained Δ$^5$-pregnene-3β,17α-diol-11,20-dione diacetate.

To a solution of 5 g. of the above compound in 100 cc. of chloroform there was added an ether solution of monoperphthalic acid containing 1.2 molar equivalents of the reagent; the mixture was allowed to react in the dark at room temperature for 20 hours and was then diluted with water; the organic layer was separated, washed first with water, then with aqueous sodium bicarbonate solution and again with water to neutral, and dried over anhydrous sodium sulfate, and the solvent was evaporated under reduced pressure. By chromatography of the residue on neutral alumina there was obtained 5α,6α-oxido-pregnane-3β,17α-diol-11,20-dione diacetate.

To a solution of 3 g. of the above compound in 300 cc. of a mixture of equal parts of ether and benzene there was added 3 cc. of boron trifluoride etherate and the mixture was allowed to react at room temperature for 3 hours. The solution was then washed with water, dried over anhydrous sodium sulfate and evaporated to dryness. The residue was purified by chromatography on neutral alumina, thus yielding 6β-fluoro-pregnane-3β,5α,17α-triol-11,20-dione diacetate.

A mixture of 2 g. of the above compound and 100 cc. of 1% methanolic potassium hydroxide solution was stirred for 12 hours at a temperature around 25° C. and under an atmosphere of nitrogen. The mixture was acidified with acetic acid, concentrated to a small volume and diluted with water, thus precipitating the 6β-fluoro-pregnane-3β,5α,17α-triol-11,20-dione under the free form. The pure compound was obtained by recrystallization from acetone-hexane.

A solution of 1 g. of the above compound in 7.5 cc. of tetrahydrofurane and 4.5 cc. of methanol was treated with 1.5 g. of pure calcium oxide in small portions and then with 1.5 g. of iodine, under continuous stirring. Stirring was continued at room temperature until the mixture turned pale yellow. It was then poured into ice water containing 4.5 cc. of acetic acid and 0.5 g. of sodium thiosulfate and the resulting mixture was stirred for 15 minutes; the solution was decanted and the precipitate was collected by filtration, thus giving 6β-fluoro-21-iodo-pregnane-3β,5α,17α-triol-11,20-dione in crude form, which was washed with water and dried under vacuum. A sample was purified by recrystallization from chloroform-methanol, avoiding overheating.

A mixture of the above crude compound, 25 cc. of anhydrous acetone and 2 g. of recently fused potassium acetate was refluxed under anhydrous conditions for 10 hours, whereupon most of the acetone was distilled. Water was added, the supernatant liquid was decanted and the residue was digested from methylene chloride. The solution was concentrated to a small volume and the residue was refluxed for 15 minutes with a mixture of 0.25 g. of sodium bisulfite, 12.5 cc. of methanol and 2.5 cc. of water. The solvent was removed under reduced pressure, the residue was treated with ice and water and the precipitate was collected by filtration, washed with water, dried and recrystallized from acetone. There was thus obtained 6β-fluoro-pregnane-3β,5α,17α,21-tetrol-11,20-dione 21-acetate.

A stirred solution of 800 mg. of the above compound in 50 cc. of 90% acetic acid was treated dropwise with a solution of 120 mg. of chromium trioxide in 10 cc. of 20% acetic acid, while the temperature was maintained below 20° C. The mixture was kept for 2 hours at room temperature, diluted with water and the precipitate was collected, washed with water, dried and recrystallized from acetone-hexane. There was thus obtained 6β-fluoro-pregnane-5α,17α,21-triol-3,11,20-trione 21-acetate.

A mixture of the above compound, 50 cc. of acetic acid and 1 cc. of aqueous concentrated hydrochloric acid was kept at room temperature for half an hour and then poured into water. The precipitate was collected, washed with water, dried and recrystallized from acetone-hexane. There was thus obtained 6β-fluoro-$\Delta^4$-pregnene-17α,21-diol-3,11,20-trione 21-acetate, identical with 6β-fluoro-cortisone 21-acetate.

A slow stream of dry hydrogen chloride was introduced for 8 hours into a solution of 500 mg. of 6β-fluoro-cortisone 21-acetate in 50 cc. of glacial acetic acid, while care was taken that the temperature did not rise over 18° C.; after pouring into water and ice the precipitate was collected, washed with water, dried and recrystallized from acetone-hexane. There was thus obtained 6β-fluoro-cortisone 21-acetate having a melting point of 215–216° C., $[\alpha]_D$, 190°, λ max. 233 mμ (log E 4.21).

*Example II*

A mixture of 2 g. of 16β-bromo-$\Delta^5$-pregnene-3β,17α-diol-11,20-dione, obtained as described in Example I, 70 cc. of 95% ethanol and 9 g. of Raney nickel was refluxed for 4 hours and the hot solution was filtered through celite under an atmosphere of nitrogen, whereafter the filter was washed with a small amount of hot ethanol. The combined filtrate and washings was evaporated to dryness and the residue was crystallized from acetone, thus affording $\Delta^5$-pregnene-3β,17α-diol-11,20-dione, identical with the intermediate obtained in accordance with Example I.

*Example III*

A solution of 3 g. of 6β-fluoro-pregnane-3β,5α,17α-triol-11,20-dione, intermediate in the method of Example I, in 100 cc. of dioxane was treated by adding thereto dropwise under stirring and at room temperature a solution of 1.4 g. of bromine in 70 cc. of dioxane. After 5 minutes the reaction mixture was poured into saturated aqueous sodium bicarbonate solution and the reaction product was extracted with chloroform. The extract was washed with water, dried over anhydrous sodium sulfate and evaporated to dryness under reduced pressure. Recrystallization of the residue from acetone-hexane yielded 6β-fluoro-21-bromo-pregnane-3β,5α,17α-triol-11,20-dione.

A solution of 3 g. of the above 21-bromo compound in 120 cc. of anhydrous acetone was treated with 3.9 g. of recently fused potassium acetate, 1.8 g. of sodium iodide and 1.5 cc. of glacial acetic acid; the mixture was refluxed for 9 hours, poured into water and the resulting product was extracted several times with chloroform. The combined extract was washed with water, dried over anhydrous sodium sulfate and evaporated to dryness. Crystallization of the residue from acetone-hexane furnished 6β-fluoro-pregnane-3β,5α,17α,21-tetrol-11,20-dione 21-acetate, identical with the intermediate compound of Example I.

*Example IV*

A solution of 3 g. of 6β-fluoro-21-bromo-pregnane-3β,5α,17α-triol-11,20-dione, obtained in accordance with Example III, in 50 cc. of absolute ethanol was treated with 6 g. of sodium iodide and kept at room temperature for 22 hours. The mixture was diluted with water, extracted with ether and the ether solution was washed with 3% sodium thiosulfate solution and water, dried over anhydrous sodium sulfate and evaporated to dryness in a bath below 30° C. The residue consisted of 6β-fluoro-21-iodo-pregnane-3β,5α,17α-triol-11,20-dione, which was subjected to the acetoxylation described in Example I, to produce 6β-fluoro-pregnane-3β,5α,17α-21-tetrol-11,20-dione 21-acetate, identical with the intermediate obtained as described in the preceding examples.

A suspension of 1.8 g. of the above compound in 60 cc. of acetone, recently distilled over potassium permanganate, was treated with an oxidizing solution of 8 N chromic acid prepared by dissolving 26.7 g. of chromium trioxide in 23 cc. of concentrated sulfuric acid and 40 cc. of water and diluting with water to 100 cc. The addition was effected dropwise, while stirring the suspension under an atmosphere of nitrogen and until the orange-brown color of the oxidant persisted in the mixture. After further stirring for 5 minutes the solution was diluted with water and the formed precipitate was collected, washed with water and recrystallized from acetone-hexane. There was thus obtained 6β-fluoro-pregnane-5α,17α,21-triol-3,11,20-trione 21-acetate, identical with the intermediate compound of Example I.

1 g. of the above compound was treated with dry hydrogen chloride in mixture with glacial acetic acid, as described with regard to this reaction in Example I, so as to effect the inversion of the steric configuration at C–6 of 6β-fluoro-cortisone. It is thus possible to achieve both the dehydration at C–5 and the inversion at C–6 in a single step, producing 6α-fluoro-cortisone 21-acetate.

The following example illustrates, for the sake of completeness, the production of the above-mentioned key intermediate from 11α-hydroxy-diosgenin.

*Example V*

A solution of 50 g. of $\Delta^5$-22a,25D-spirosten-3β,11α-diol (a mixture of 11α-hydroxy-diosgenin and the 25-isomer of the latter) in 200 cc. of pyridine was cooled to 0° C. and slowly treated, with stirring with 11.5 cc. of acetic anhydride, while the temperature was maintained at 0° C. The mixture was kept standing at a temperature around 0° C. for 6 hours, poured into water and extracted with ethyl acetate; the extract was consecutively washed with dilute hydrochloric acid, 5% sodium carbonate solution and water, dried over anhydrous sodium sulfate, filtered and evaporated to dryness. The residue consisted of 11α-hydroxy-diosgenin 3-monoacetate. The analytical sample was obtained by chromatography.

45 g. of the crude 11α-hydroxy-diosgenin 3-acetate was dissolved in 500 cc. of 90% acetic acid and then slowly treated under stirring with a solution of 10 g. of chromium trioxide in 50 cc. of 80% acetic acid, which was added in the course of half an hour. The mixture was kept for 2 hours at room temperature, poured into ice water and extracted with ethyl acetate; the extract was washed with 5% sodium carbonate solution and water, dried over anhydrous sodium sulfate, filtered and evaporated to dryness. The residue was chromatographed on activated alumina and the crystalline fractions eluted were recrystallized from methanol. There was thus obtained 3β-acetoxy-$\Delta^5$-22a,25D-spirosten-11-one, namely 11-keto-diosgenin acetate.

30 g. of this 11-keto-diosgenin acetate in 300 cc. of acetic anhydride was heated for 8 hours in a pressure bomb at 175–180° C. The mixture was poured into water and extracted with ether, and the extract was washed with water, dried over anhydrous sodium sulfate, filtered and evaporated to dryness. The residual oil was dissolved in 400 cc. of acetic acid and 420 cc. of ethylene dichloride, cooled to 15° C. and treated dropwise with a solution of 27 g. of chromium trioxide in 460 cc. of 80% acetic acid, with stirring and maintaining the temperature of the mixture below 15° C. After 2 hours at room temperature it was poured into water, extracted with chloroform, washed with water, dried over anhydrous sodium sulfate and evaporated to dryness. The residue was chromatographed in a column of unwashed alumina, thus producing $\Delta^{5,16}$-pregnadien-3$\beta$-ol-11,20-dione acetate.

The 6$\alpha$-fluoro derivatives of cortisone, as well as the 21-esters of these compounds previously mentioned are important cortical hormones having anti-inflammatory properties of a high order together with a minimum of side reaction such as salt retention. For example, in liver glycogen tests, a standard test for anti-inflammatory activity, 6$\alpha$-fluoro-hydrocortisone acetate is at least ten times as active as the standard used for testing, namely, hydrocortisone acetate. In contrast, the 6$\beta$-fluoro-hydrocortisone acetate has been reported to be totally inactive in a similar test (E. Myles Glenn et al., Endocrinology, vol. 61, pages 128–142, especially page 141, 1957).

We claim:

1. A process for the production of 6$\alpha$-fluoro-cortisone 21-acetate from a degradation product of botogenin, comprising the steps of:
   (a) reacting a lower fatty acid ester of $\Delta^{5,16}$-pregnadiene-3$\beta$-ol-11,20-dione with hydrogen peroxide in an alkaline medium in order to epoxidize the double bond between C-16 and C-17 of the starting compound and de-esterify the latter, obtaining 16$\alpha$,17$\alpha$-oxido-$\Delta^5$-pregnen-3$\beta$-ol-11,20-dione;
   (b) reacting the latter compound with hydrogen bromide in an organic solvent inert to the ensuing reaction;
   (c) catalytically hydrogenating the resulting 16$\beta$-bromo-$\Delta^5$-pregnene-3$\beta$,17$\alpha$-diol-11,20-dione until the equivalent of one mol of hydrogen is absorbed so as to produce $\Delta^5$-pregnene-3$\beta$,17$\alpha$-diol-11,20-dione;
   (d) reacting the latter with acetic anhydride in the presence of an acid catalyst and reacting the resulting product with a peracid to produce 5$\alpha$,6$\alpha$-oxido-pregnane-3$\beta$,17$\alpha$-diol-11,20-dione diacetate;
   (e) reacting the diacetate with boron trifluoride etherate in mixture with ether and benzene and then hydrolyzing the acetoxy groups of the resulting product with a dilute methanolic solution of potassium hydroxide at low temperature and under an atmosphere of nitrogen, so as to obtain 6$\beta$-fluoro-pregnane-3$\beta$,5$\alpha$,17$\alpha$-triol-11,20-dione;
   (f) reacting the latter product with iodine so as to obtain 6$\beta$-fluoro-21-iodo-pregnane-3$\beta$,5$\alpha$,17$\alpha$-triol-11,20-dione, and refluxing the latter with potassium acetate in mixture with acetone so as to produce 6$\beta$-fluoro-pregnane-3$\beta$,5$\alpha$,17$\alpha$,21-tetrol-11,20-dione 21-acetate;
   (g) oxidizing the latter 21-acetate with chromic acid in a medium selected from the group consisting of aqueous acetic acid and aqueous acetone, so as to obtain 6$\beta$-fluoro-pregnane-5$\alpha$,17$\alpha$,21-triol-3,11,20-trione acetate;
   (h) reacting the latter product with hydrochloric acid in mixture with acetic acid so as to dehydrate the latter product at C-5 and to invert the steric configuration at C-6 from ($\beta$) to ($\alpha$), obtaining 6$\alpha$-fluoro-cortisone 21-acetate.

2. The process described in claim 1, characterized in that the starting compound is $\Delta^{5,16}$-pregnadien-3$\beta$-ol-11,20-dione 3-acetate.

3. The process described in claim 1, characterized in that step (a) is carried out with concentrated hydrogen peroxide solution and methanol in mixture with aqueous sodium hydroxide solution.

4. The process described in claim 1, characterized in that the inert solvent used in step (b) is a mixture of acetic acid and methylene chloride.

5. The process as described in claim 1, characterized in that the catalytic hydrogenation step is effected with a palladium-on-charcoal catalyst in mixture with methanol and in the presence of ammonium acetate.

6. The process as described in claim 1, characterized in that the catalytic hydrogenation step is effected by refluxing with Raney nickel in mixture with ethanol.

7. The process as described in claim 1, characterized in that the peracid used in step (d) is monoperphthalic acid in mixture with ether and chloroform.

8. The process as described in claim 1, characterized in that step (f) is carried out with iodine and calcium oxide in mixture with tetrahydrofurane and methanol.

9. The process as described in claim 1, characterized in that the product obtained from step (g) is first reacted with small amounts of aqueous concentrated hydrochloric acid in mixture with acetic acid and that the resulting dehydrated product is then reacted with dry hydrogen chloride in mixture with glacial acetic acid to achieve the ($\beta$) to-($\alpha$) inversion at C-6.

10. The process as described in claim 1, charactized in that the product obtained from step (g) is reacted with dry hydrogen chloride in mixture with glacial acetic acid in order to achieve the dehydration of the product at C-5 and the ($\beta$)-to-($\alpha$) inversion at C-6 in a single process step.

11. The process as described in claim 1, characterized in that step (f) is carried out by reacting the product obtained by step (e) with one molar equivalent of bromine in mixture with dioxane, and further reacting the resulting 21-bromo intermediate with sodium iodide in ethanol solution.

12. The process described in claim 11, characterized in that the intermediarily formed 21-bromo product of step (f) is refluxed with potassium acetate and sodium iodide in mixture with acetone and in the presence of acetic acid so as to produce directly 6$\beta$-fluoro-pregnane-3$\beta$,5$\alpha$,17$\alpha$,21-tetrol-11,20-dione 21-acetate.

13. 16$\beta$-bromo-$\Delta^5$-pregnene-3$\beta$,17$\alpha$-diol-11,20-dione.

14. 5$\alpha$,6$\alpha$-oxido-pregnane-3$\beta$,17$\alpha$-diol-11,20-dione diacetate.

15. A member of the group consisting of 6$\beta$-fluoro-pregnane-3$\beta$,5$\alpha$,17$\alpha$-triol-11,20-dione and the 3,17-diacetate thereof.

16. 6$\beta$-fluoro-21-bromo-pregnane-3$\beta$,5$\alpha$,17$\alpha$-triol-11,20-dione.

17. 6$\beta$-fluoro-21-iodo-pregnane-3$\beta$,5$\alpha$,17$\alpha$-triol-11,20-dione.

18. 6$\beta$-fluoro-pregnane-3$\beta$,5$\alpha$,17$\alpha$,21-tetrol-11,20-dione 21-acetate.

19. 6$\beta$-fluoro-pregnane-5$\alpha$,17$\alpha$,21-triol-3,11,20-trione 21-acetate.

References Cited in the file of this patent

UNITED STATES PATENTS

| | | |
|---|---|---|
| 2,684,364 | Jones | July 20, 1954 |
| 2,752,339 | Julian et al. | June 26, 1956 |
| 2,787,623 | Gebert | Apr. 2, 1957 |
| 2,805,230 | Stork et al. | Sept. 3, 1957 |
| 2,838,497 | Spero et al. | June 10, 1958 |
| 2,838,528 | Campbell et al. | June 10, 1958 |
| 2,883,403 | Rothman et al. | Apr. 21, 1959 |
| 2,951,840 | Ringold et al. | Sept. 6, 1960 |

OTHER REFERENCES

Bowers et al.: 80 J.A.C.S., 4423–24 (1958).
Rothman et al.: 81 J.A.C.S., 411–415 (1959).